SUBSCRIPTION TELEVISION DISTRIBUTION WITH CONTROLLED REJECTION FILTERS FOR CARRIER AND INTERFERENCE SIGNALS

Filed April 10, 1964

INVENTORS
PATRICK BASS
JOHN M. COOPER
BY Holcombe, Wetherill & Brisebois
ATTORNEYS United States Patent Office 3,347,982
Patented Oct. 17, 1967

3,347,982
SUBSCRIPTION TELEVISION DISTRIBUTION WITH CONTROLLED REJECTION FILTERS FOR CARRIER AND INTERFERENCE SIGNALS

Patrick Bass and John Maurice Cooper, London, England, assignors to R. & R. Research Limited

Filed Apr. 10, 1964, Ser. No. 358,843
Claims priority, application Great Britain, Apr. 16, 1963, 14,809/63
7 Claims. (Cl. 178—5.1)

Figure 1:
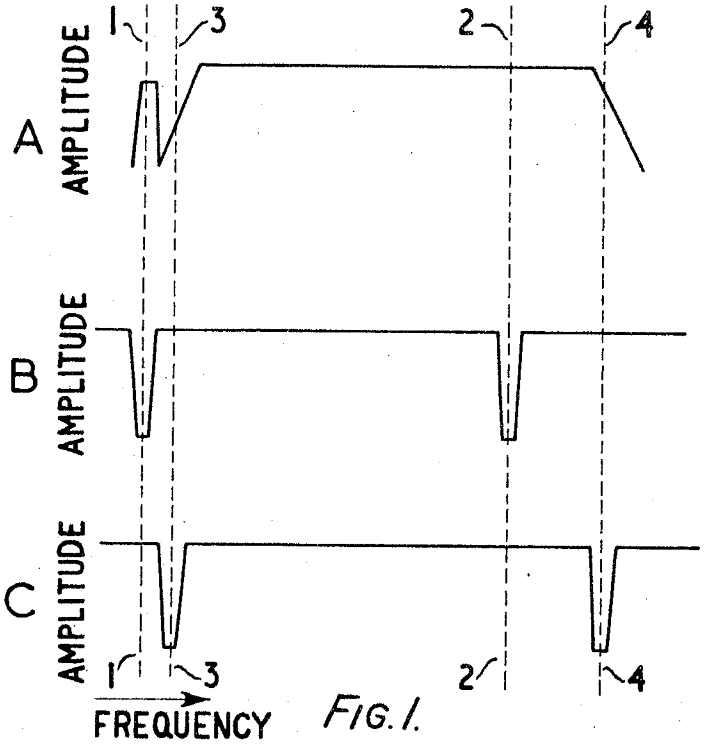

This invention relates to television systems, either wire or radio. The invention is particularly applicable to subscription television systems i.e. systems wherein subscriber's are charged for some or all of the programmes they receive, on one or more channels. The term "wire" is intended to include a waveguide of pipe or strip form.

The invention is applicable to closed circuit systems in which only selected viewers may view the programmes, with or without fee payment.

When fees are payable, these may be on a period rental basis, or may be specific fees in respect of individual programmes.

According to the present invention there is provided a television system comprising television transmitter equipment and means to transmit an interference signal, and a cooperative television receiver equipment in combination with rejection filter means arranged to prevent inhibition of intelligible picture reproduction by picture signal receiving and reproduction means in said equipment, which is otherwise responsive to said interference signal.

The invention also provides a television system comprising at a transmitter station means to generate, a programme picture signal occupying a given frequency band, a programme sound signal at a frequency outside said band, and an interference signal having a selected frequency inside said given frequency band, and means to transmit said signals, and comprising at a cooperative receiver station, first receiver means tuned to receive signals having said sound signal frequency, second receiver means tuned to receive signals having frequencies within said given frequency band, picture reproducing means coupled to said second receiver means to reproduce from said picture signal, and rejection filter means coupled to said second receiver means to reject signals having said selected frequency but to accept other signals in said band, whereby a picture may be reproduced intelligibly when and only when said filter means is operable to reject.

The invention further provides a television system comprising a transmitting station for generating and transmitting to one or more receiving stations at least one picture signal modulated as a vestigial sideband signal upon a first carrier wave of a first frequency and a concomitant sound signal modulated upon a second carrier wave of a second frequency together with one or more interference signals transmitted as further carrier waves each at a respective frequency, the frequency of one of said interference carrier waves being adjacent the frequency of one of said television and sound signal carrier waves but not between those frequencies, the or each said receiving station including means whereby when an appropriate debit has been established there is included in the path of signals from said transmitting station to reproducing means at said receiving station a filter arranged to attenuate only said interference carrier frequencies.

In a television distribution system according to the present invention in which more than one interference carrier is transmitted, one or more of said interference carriers may have a frequency between the frequency of said television signal carrier and the frequency of said sound signal carrier and said receiving station will include a plurality of filters each arranged, when connected in the signal path as a result of the establishment of an appropriate debit to attenuate a respective one of said interference carrier frequencies.

The effect of the interference carrier or carriers may be enhanced by modulating them or, when more than one such interference carrier is used, the frequency separation between two of these carriers can be equal to, or approixmately equal to, the frequency separations between the vision and sound carriers of the pay programme so that the frequency beats resulting from the frequency difference of the two interference carriers concerned cause additional interference in receivers employing an intercarrier sound system.

Figure 2:
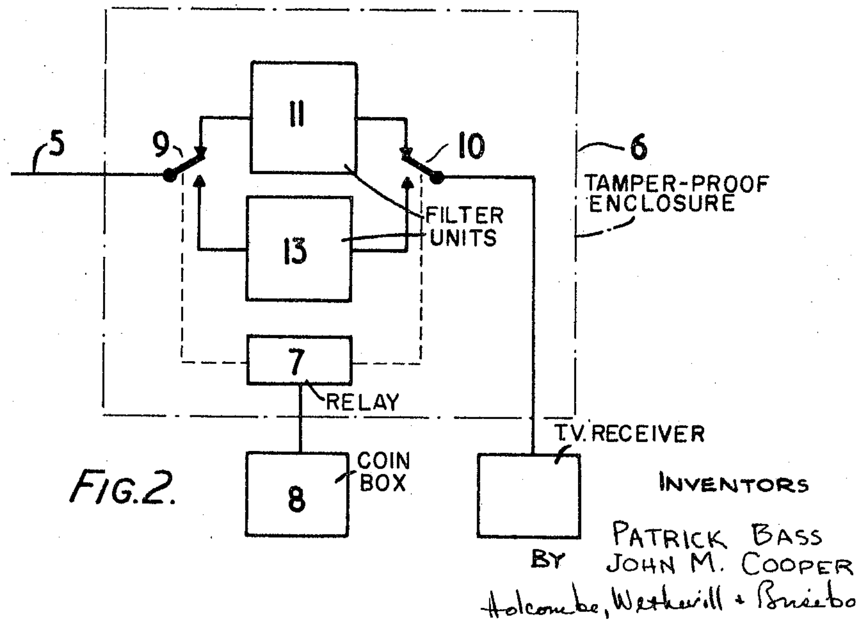

The invention will now be further described with reference to the accompanying drawings which comprise two figures of which:

FIGURE 1 consists of diagrams illustrating the operation of a television system embodying the present invention, and FIGURE 2 is a diagram illustrating one embodiment of apparatus for use at a subscriber's station in a television system according to the present invention.

In FIGURE 1, diagram A shows the frequency distribution of the pay programme signals where 1 and 2 are respectively the sound and vision carrier frequencies of which the frequency is depicted along the abscissa and amplitude along the ordinate. The frequency and amplitude are similarly depicted in the diagrams B, C of which B shows the characteristics of filters designed to depress the pay programme signals 1 and 2 until the subscriber accepts the programme, and C shows the characteristics of filters designed to depress two interference carrier waves 3 and 4 whilst leaving the pay programme signals free to enter the subscriber's receiver. It has been found that .5 or .75 mc./s. difference between the frequencies 2 and 4 leads to satisfactory operation.

FIGURE 2 shows diagrammatically the arrangement of a subscriber's station of a wired television system according to one embodiment of the present invention. Incoming signals arrive by way of a coaxial cable 5 which is preferably sealed into a tamper-proof enclosure indicated by broken line 6. This enclosure contains a relay 7 operated by the insertion of appropriate coins into a coin box mechanism 8. Relay 7 has two sets of contacts 9 and 10 which operate together so that when the relay is de-energised, the contacts are positioned as shown, and the incoming signals are fed by way of a filter unit 11 to a subscriber's receiver 12. The characteristics of filter unit 11 are as hereinbefore described with reference to diagram B in FIGURE 1, so that the programme signals are attenuated and the interference carriers pass unattenuated to the subscriber's receiver. When the relay 7 is energised, on insertion of appropriate coins in coinbox mechanism 8, the contact positions are changed so that the signal received by way of coaxial cable 5 passes through a filter unit 13 to the subscriber's receiver 12. Filter 13 has the response already described with reference to diagram C of FIGURE 1, attenuating the interference carriers and allowing the programme signals to pass to the subscriber's receiver 12.

In another embodiment of prepayment television apparatus according to the invention the change in attenuation characteristics is obtained by altering the characteristics of a single set of filters, e.g. by adjustment or insertion of a trimmer capacitor, so as to attenuate the programme signals or the interference carriers depending upon whether or not the relay is operated. The attenuation at the central reject frequency may be 50 db or more, if desired. The attenuation, and frequency separations are chosen according to the characteristics of the rest of the equipment.

The interference carriers may of course be modulated to increase the degree of interference and such modulation could advantageously take the form of visual programme price information, programme identification code or audio modulation of announcements relating to the pay programmes.

The frequencies of the interference carriers may be changed from time to time so that a knowledge of the changes would be necessary to obtain useful reception. The interference carriers might also be transmitted at a greater amplitude than the pay programme picture and/or sound signals so that the automatic gain control circuit of unauthorized receivers, or receivers in which the reject filter means is not effective, would tend to suppress the picture signals or sound signals.

The television and interference signals in a prepayment television system according to the present invention could of course be radiated in which case the interference carriers would also be radiated at the same time and preferably from the same place as the programme signals.

In the above described embodiment, reproduction of specific paid programmes is enabled by individual payments being caused to reject the interference carrier. The invention is also applicable to a "Season Ticket" system of pay television, i.e. one in which each subscriber is charged a flat fee no matter how many or how few programmes he watches; there is consequently no need for any coin boxes or metering equipment. If a CATV network is used for a system of this kind, it is unlikely that every one of the existing subscribers will take the pay-TV service, and some method of effectively preventing the reception of the pay channel while permitting the continued unimpaired reception of the free programmes will therefore be required.

An interference signal is transmitted on the pay channel with the vision signal and this serves to introduce a moderate degree of effective scrambling while at the same time blocking the receiver A.G.C. circuits of those subscribers who are not authorised to receive the pay programme. The interference signal takes the form of an additional carrier modulated with a low-frequency interfering signal and spaced approximately 0.5 mc./s. away from the vision carrier on the vestigial sideband. Each subscriber, whether he takes the pay-TV service or not, is equipped with a narrowband notch filter which is inserted in series with the drop-in cable at a convenient point near the receiver. In the case of a pay-TV subscriber, the filter is tuned to reject the guard carrier frequency as shown in FIGURE 1C, thus permitting reception of the pay programmes without interference. Where a subscriber is not prepared to accept the pay-TV service the filter is tuned to reject the vision carrier frequency as shown in FIGURE 1B, so that the interference carrier is applied to the receiver at full strength. The subscriber cannot therefore receive the pay programme picture because in the first place the vision carrier has been substantially attenuated by the filter and in the second place the effective sensitivity of the receiver has been greatly reduced by the response of the A.G.C. circuit to the presence of the interference carrier. Neither is it likely that he can receive the pay programme sound since most modern television receivers designed for 525 and 625-line standard operate on the intercarrier sound principle which requires the presence of the vision carrier together with the F.M. sound carrier. The reduced sensitivity of the receiver caused by the interference carrier provides a further obstacle to sound reception because the vision and sound signals nearly always pass through a common amplifier which is controlled by the A.G.C. circuit in the receiver.

An advantage of this system is that if the effectiveness of a filter were reduced through a subscriber tampering with it or its leads, or through misalignment or any other circumstances, the subscriber would still not receive the pay programme clearly because of the scrambling interference caused by the presence of the interference carrier. This interference consists of the frequency beat between the guard carrier and the vision carrier plus the low-frequency interference transmitted as modulation of the interference carrier, which together produce a very unpleasant effect on the picture. The scrambling provided by the interference carrier also adds to the difficulties of a pirate who attempts to receive the pay programmes by picking-up any signals that might be radiated by the network with a piece of wire wrapped around the cable or with a high-gain aerial.

The only additional items of equipment needed to distribute pay programme signals over a CATV network by the Guard Carrier method are a narrow-band notch filter for each subscriber and an interference carrier generator which is installed at the transmitting centre. The filter takes the form of a small printed circuit unit housed in a plastic box. It provided an attenuation of greater than 50 db at the tuned carrier frequency, and the insertion loss over the V.H.F. range covered by the television bands is less than 3 db. The filter may be tuned to either the vision carrier or the interference carrier frequency after installation in the house, and a lead seal is provided to prevent tampering by the subscriber. Designs are easily made available for any channel in the American V.H.F. low band or the European band I.

The guard carrier generator establishes a precision offset frequency relationship with the vision carrier so that the degree of rejection needed to remove the interference for pay-TV subscribers is held substantially constant and within the limits of the filter characteristics. It is highly desirable that the vision carrier frequency and the frequency of the horizontal synchronising pulses from which the offset-interference carrier frequency is derived, should both be crystal controlled to coincide accurately with the corresponding rejection frequencies to which the filters are tuned. The frequency of the interfering modulation signal is preferably adjustable and it is found in practice that a setting of approximately 10 c./s. below the video field frequency produces the maximum scrambling effect. The modulated interference carrier is injected into the network at the same point as the vision carrier and is distributed by the existing repeat amplifiers at approximately the same level.

The degree of commercial security obtained so far as radiation from the network is concerned will depend to some extent on the type of cable that has been used. Tests carried out on existing networks have shown that those of solid aluminium or welded copper screened cable are generally completely satisfactory in this respect. Networks of cable having a double-braid screen with inter-sheath are generally preferable to networks using single-braid cable.

The network channel adjacent to the pay channel on the side of the interference carrier should be left vacant, since there is a risk that the interference carrier would also interfere with reception on this adjacent channel. In practice this rarely presents a difficulty, because there are generally channels occupied by radiated transmissions which cannot in any event be used on the network; alternatively, the pay programmes could be distributed on the channel at the edge of the band if this happens to be free.

The line tapper used to connect a subscriber's drop-in cable to the network should provide an impedance match for the cable (usually 50 or 75 ohms) otherwise the response of the filter will be affected.

A subscription or pay television system according to the invention may include the arrangements for charging fees for the programmes by a pricing signal, and counting or recording the number of subscribers who view particular programmes (for audience measurement), which are disclosed in our copending British patent application 6,652/63.

We claim:

1. A television system comprising at a transmitting station video generator means producing a program picture signal modulated upon a video carrier of predetermined frequency and occupying a predetermined frequency band, audio generator means producing a program sound signal modulated upon a sound carrier wave having a frequency outside said frequency band, interference generator means producing an interference signal having a selected frequency within said frequency band, further interference signal generator means producing a further interference signal having a further selected frequency within said frequency band and adjacent said sound carrier, together with means for transmitting all said signals to a receiving station; and comprising at a co-operative station first receiver means operable by said modulated sound signals to reproduce said sound program, second receiver means operable by said modulated program picture signal to reproduce said picture, circuit means operable to receive said transmitted signals and to apply them to said receiver means by way of switch means and filter means, wherein in said one switch position said filter means operates to attenuate signals of said selected frequency and of said further selected frequency more than signals of said video carrier frequency and of sound carrier frequency, and operates in said other condition of said switch to attenuate signals of said video carrier frequency and of said sound carrier frequency more than signals of said selected frequency and of said further selected frequency, whereby said picture and sound programs may be reproduced intelligibly when and only when said switch is in said one condition, means for establishing a fee demand in respect to said program, and control means operated when said fee demand is set to adjust said switch to said one position.

2. A television system as claimed in claim 1 wherein said interference signal has a frequency differing from that of said sound carrier more than does the frequency of said vision carrier.

3. A television system according to claim 1 wherein said control means includes means for recording said fee demand.

4. A television system according to claim 1 wherein said signals are distributed to a plurality of receiver equipment by a wire network.

5. A television system according to claim 1 wherein said second receiver means includes automatic gain control means operable by received signal or predetermined amplitude to reduce the gain of the picture signal circuits, and wherein the amplitude at which said interference signal is transmitted is sufficient to actuate said gain control circuits further to reduce the amplitude of said picture signal.

6. A television system in accordance with claim 2 wherein the frequency of said further interference signal is adjacent the frequency of said sound carrier and differs from the frequency of said video carrier less than does the frequency of said sound carrier.

7. A television set for receiving signals transmitted by a transmitting station comprising video generator means producing a program picture signal modulated upon a video carrier of predetermined frequency and occupying a predetermined frequency band, audio generator means producing a program signal modulated upon a sound carrier wave having a frequency outside said frequency band, interference generator means producing an interference signal having a selected frequency within said frequency band, further interference signal generator means producing a further interference signal having a further selected frequency within said frequency band and adjacent said sound carrier, together with means for transmitting all said signals to a receiving station, said receiving set comprising first receiver means operable by said modulated sound signals to reproduce said sound program, second receiver means operable by said modulated program signal to reproduce said picture, circuit means operable to receive said transmitted signals and to apply them to said receiver means by way of switch means and filter means, said filter means operating in one condition of said switch means to attenuate signals of said selected frequency and of said further selected frequency more than signals of said video carrier frequency and of said sound carrier frequency, and operating in said other condition of said switch to attenuate signals of said video carrier frequency and of said sound carrier frequency more than signals of said selected frequency and of said further selected frequency, whereby said sound and picture programs may be reproduced intelligibly when and only when said switch is in said one condition, means for establishing a fee demand in respect of said programs, and control means operated when said fee demand is met to adjust said switch to said one position.

References Cited

UNITED STATES PATENTS

| | | | |
|---|---|---|---|
| 3,157,737 | 11/1964 | Schlafly | 178—5.1 |
| 3,175,033 | 3/1965 | Blonder | 178—5.1 |
| 3,202,758 | 8/1965 | Brownstein | 178—5.1 |

JOHN W. CALDWELL, *Acting Primary Examiner.*

DAVID G. REDINBAUGH, *Examiner.*

H. W. BRITTON, *Assistant Examiner.*